UNITED STATES PATENT OFFICE.

CHARLES KATZENBERGER, OF HOBOKEN, NEW JERSEY.

COMPOSITION OF MATTER FOR DESTROYING INSECTS.

1,207,766.  Specification of Letters Patent.  Patented Dec. 12, 1916.

No Drawing.  Application filed November 23, 1912.  Serial No. 733,154.

*To all whom it may concern:*

Be it known that I, CHARLES KATZENBERGER, a citizen of the United States, and a resident of Hoboken, county of Hudson, and State of New Jersey, have invented a new and useful Composition of Matter for Destroying Insects, of which the following is a full, clear, and exact specification.

My invention has for its object to provide a composition of matter designed to be employed for destroying mosquitos, flies, or like insects in buildings, or other structures, and which is preferably made in the form of an inflammable candle adapted to be ignited for impregnating the atmosphere with fumes having properties which are destructive to the insects, but are non-injurious and pleasant for a person to inhale as well as being free from any damaging action upon the texture, or colors of fabrics, draperies, clothes, or other articles.

My composition of matter consists of the following ingredients, combined in the proportions stated, viz:

Chrysanthemum cinerariæfolium (buhach) ---- 6 pounds.
Fine particles of pine wood (sawdust) ------- 3 pounds.
Sanguis draconis (dragon's blood powdered) -- ½ ounce.
Gummi-resina galbanum ----------------------- 1½ ounces.
Gummi tragacanthæ --------------------------- 2 ounces.
Potassii nitras (saltpeter powdered) -------- 2 ounces.
Magnesium silicate (talc powdered) ---------- 2 ounces.
Water, sufficient quantity.

The ingredients are thoroughly mixed together by agitation in a suitable receptacle, and if desired the composition may be used in powdered form by igniting a portion thereof after being placed upon a dish, pan, or other suitable vessel so that the products of combustion therefrom will be distributed through the infected parts of the building, or structure. But when it is preferred to employ the composition in the form of candles a sufficient quantity of the water is incorporated in the mixed ingredients, and by any suitable method of stirring or grinding a mass will be produced of a consistency wherein its particles will adhere together. The mass may then be rolled into sheets, and candles preferably of a triangular shape are cut therefrom, or by the use of molds other shapes of candles may be produced. The candles are subsequently allowed to dry at a moderate temperature, after which one, or more may be used by being supported upon a suitable vessel, and ignited so that the fumes therefrom will impregnate the atmosphere of the place in which the insects are confined.

The talc in the composition does not support combustion but becomes a soft and sticky mass under the action of the water of crystallization of the talc, potassium nitrate, and the sticky residues derived from the other constituents of the composition when a candle formed therefrom is destroyed by slow combustion. The ash resulting from the combustion of the composition is retained by the sticky mass formed about the talc as a basis. The residue of combustion is thus prevented from scattering.

Having thus described my invention, I claim as new and desire to secure by Letters Patent:—

The herein described composition of matter including buhach six pounds, fine particles of wood three pounds, dragon's blood powdered one-half ounce, galbanum one and one-half ounces, gum tragacanth two ounces, potassium nitrate two ounces, means for preventing the ashes formed by burning the composition from scattering, said means comprising talc two ounces, and sufficient water to produce a pasty mass of the said ingredients as described and for the purpose specified.

This specification signed and witnessed this twenty-second day of November A. D. 1912.

CHARLES KATZENBERGER.

Witnesses:
 ROBT. B. ABBOTT,
 M. DUMODY.